Nov. 5, 1929.                C. FUNCK                    1,734,084
       DEVICE FOR INVESTIGATING AND ASCERTAINING THE DIGESTIVE
       ACTION OF THE STOMACH AND THE CHANGES OF ITS CONTENTS
                         Filed March 18, 1929

C. Funck
    INVENTOR

By: Marks & Clerk
            Attys.

Patented Nov. 5, 1929

1,734,084

UNITED STATES PATENT OFFICE.

CARL FUNCK, OF COLOGNE-ON-THE-RHINE, GERMANY

DEVICE FOR INVESTIGATING AND ASCERTAINING THE DIGESTIVE ACTION OF THE STOMACH AND THE CHANGES OF ITS CONTENTS

Application filed March 18, 1929, Serial No. 348,091, and in Germany May 18, 1928.

This invention relates to a device by means of which it is rendered possible to investigate and ascertain the digestive action of the stomach, as well as the changes of its contents. That investigation and ascertainment is effected electrically, and can be effected, besides, on a graphical way. Up to now it has been necessary to withdraw from the stomach, in order to make an investigation etc. of the kind stated, a part of its contents by means of a suitable hose, but this procedure can now be dispensed with, and furthermore the possibility is afforded to make that investigation etc. and to observe the natural digestive action in the stomach electrically and graphically whereby by far more accurate and reliable results are obtained.

The chief member of the invention is an electric probe or stylet which is to be introduced into the stomach and supplied with current. The circuit to which pertain also the current-carrying conductors of the probe or stylet is interrupted at the lowermost part thereof which is that to be introduced into the stomach, and the place of interuption is surrounded with a hollow body having about the shape of a pill and being so designed that a small portion of the contents of the stomach can find access to that place of interruption of the electric circuit.

Another characteristic feature of the invention consists therein that at least one of the conductor ends where the circuit is interrupted (may be, however, both ends) is covered with, and insulated (may be, partly insulated) by, a substance or substances adapted to be affected by the contents of the stomach, that is to say, a substance or substances which can be digested by said contents. According to the gradual digestion of the respective substance or substances the resistance counteracting the passage of the electric current at the said place of interruption of the circuit, and the height of the resistance ascertained in any given case, allows of drawing conclusions as to the digestion process. The source of current is arranged in the outer part of the circuit, and there is in this part also a measuring device, may be also a recording or registering device, and the like.

Figure 1:
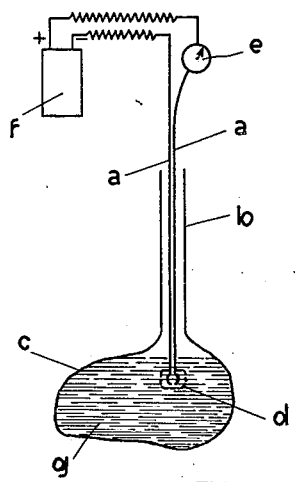
Figure 2:
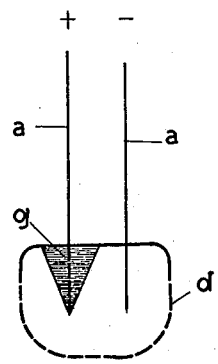

The invention is illustrated diagrammatically and by way of example on the accompanying drawing, on which Figure 1 is a vertical section through a stomach, in combination with the probe or stylet, the appertaining electric circuit, the source of current, and a measuring device, and Figure 2 is a representation of a certain distinct case which is explained hereinafter, this figure being drawn to an enlarged scale relatively to Fig. 1.

$a\ a$ are two thin insulated wires which can be introduced into the alimentary pipe and down into the stomach; they terminate at their lower ends in a hollow body $d$ having about the shape of a pill and consisting, for instance, of hard rubber. The outer part of the circuit, into which the wires $a\ a$ are inserted contains a source of current $f$ and a feeble-current ammeter $e$. This instrument may be designed as a recording or registering instrument, for instance in the manner of a recording or registering barometer.

The hollow body $d$ has an aperture through which a part of the contents of the stomach can enter into it and fill up the gap between the ends of the wires $a\ a$. As the contents of the stomach is conducting the current, the circuit is closed and the current can circulate in or through it. The substance effecting the closure of the circuit presents a certain resistance, and the height of the resistance depends upon the condition or nature of that substance, especially upon its contents of acids. The indication at the instrument $e$ or the equivalent thereof permits, thus, to draw conclusions as to the chemical condition of the contents of the stomach.

In Fig. 1 $c$ denotes the stomach and $g$ the contents thereof. When the hollow body $d$ has been introduced into the mass $g$ and has got filled with it, the gap between the ends of the wires $a\ a$ is thereby closed and so is the circuit.

If the physician wishes to observe not only the changes taking place in the contents of the stomach, but also the digestive action of the latter, wherefrom particularly important conclusions as to the quality of this action can be drawn, especially if a so-called testobject is used, the arrangement shown in Fig. 2 is used, according to which such a separate test-object $g$ is attached to one of the wire ends. The variations or changes now to be observed in the electric current with the aid of the instruments provided for this purpose permit to draw conclusions as to the digestion which the test-object undergoes in the contents of the stomach into which it is immersed. If desired or thought advantageous to the purpose in view, each of the two wire-ends may receive a test-object.

The test-object $g$ may be a wedge-shaped or conical piece of the white of an egg which completely enclosed the respective wire end and insulates it from the other wire-end, as in Fig. 2. When the digestion process commences, first the lower end of the inverted test-piece $g$ is decomposed and digested, whereby a correspondingly small portion of that insulated wire-end is exposed to the contents of the stomach so that the circuit is closed by this contents. The current traversing the circuit becomes the stronger, the more of the substance $g$ is being digested. The increase of the strength can be measured and be made visible by a graphical record with the aid of a suitable instrument.

It is, thus, in fact, possible to measure the changes taking place in the contents of the stomach during the digestion, as well as to ascertain how a test-object is affected by that contents, without withdrawing a part of this latter from the stomach. Both effects may be transmitted to the same instrument and may act on it in the same sence or direction.

I claim:

1. A device for investigating and ascertaining the digestive action of the stomach and the changes of its contents, comprising, in combination, an electric probe or stylet adapted to be introduced into the stomach, an exterior circuit into which said probe or stylet is inserted, a source of current and an instrument both also inserted into said current, said instrument being adapted to measure the variations taking place in the current in consequence of the action of the contents of the stomach, substantially as set forth.

2. A device for investigating and ascertaining the digestive action of the stomach and the changes of its contents, comprising, in combination, an electric probe or stylet adapted to be introduced into the stomach and having a gap between the lower ends of the conducting wires; an exterior circuit into which said probe or stylet is inserted, a source of current and an instrument both also inserted into said current, said instrument being adapted to measure the variations taking place in the current in consequence of the action of the contents of the stomach, substantially as set forth.

3. A device for investigating and ascertaining the digestive action of the stomach and the changes of its contents, comprising, in combination, an electric probe or stylet adapted to be introduced into the stomach and having a gap between the lower ends of the conducting wires; a piece of a digestible substance attached at least to one of said ends; an exterior circuit into which said probe or stylet is inserted, a source of current and an instrument both also inserted into said current, said instrument being adapted to measure the variations taking place in the current in consequence of the action of the contents of the stomach, substantially as set forth.

In testimony whereof I affix my signature.

CARL FUNCK.